UNITED STATES PATENT OFFICE.

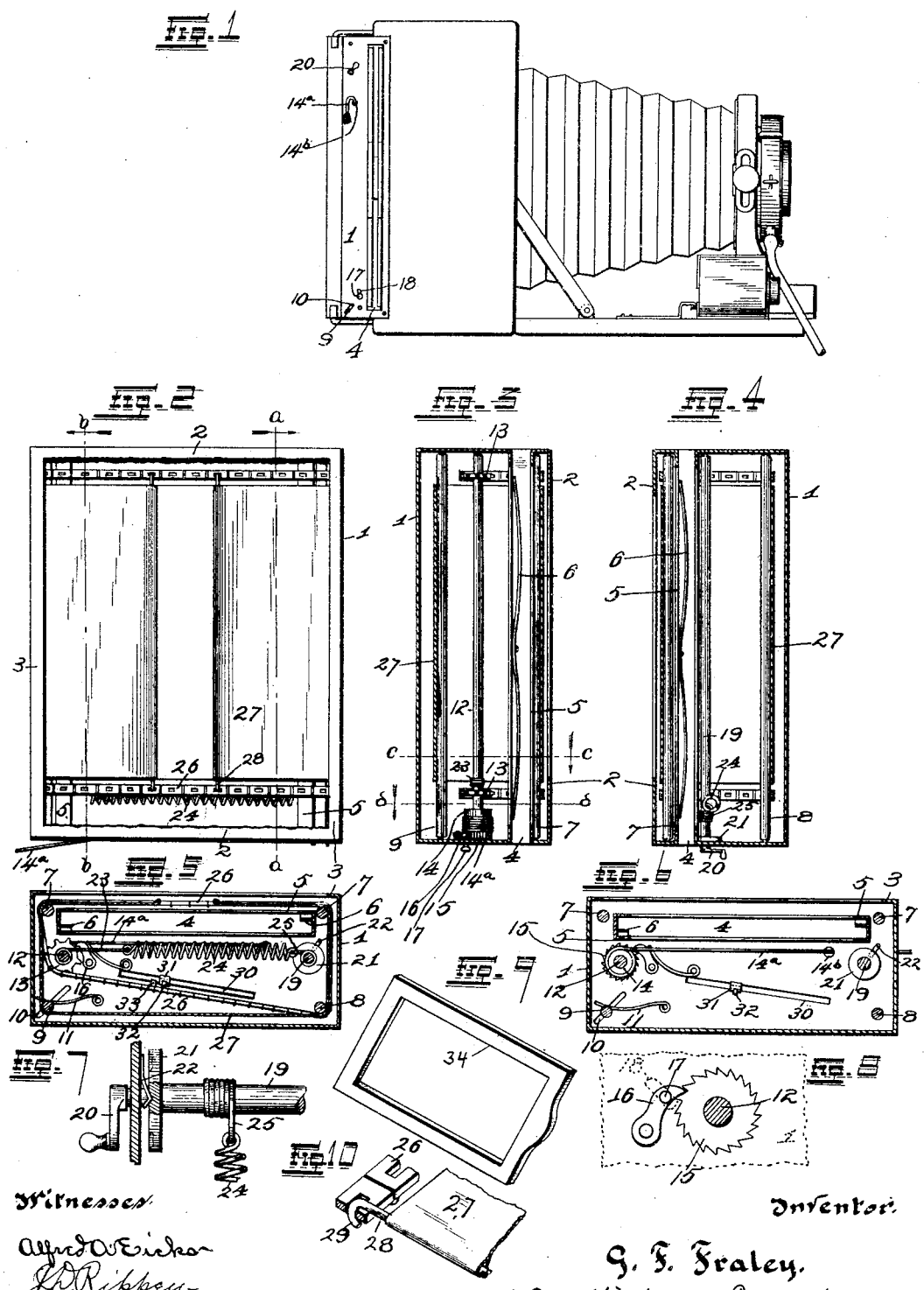

GASSNER F. FRALEY, OF ST. LOUIS, MISSOURI.

FOCAL-PLANE CAMERA-SHUTTER.

SPECIFICATION forming part of Letters Patent No. 684,750, dated October 15, 1901.

Application filed April 30, 1900. Serial No. 14,949. (No model.)

*To all whom it may concern:*

Be it known that I, GASSNER F. FRALEY, of the city of St. Louis, State of Missouri, have invented certain new and useful Improvements in Focal-Plane Camera-Shutters, of which the following is a full, clear, and exact description, reference being had to the accompanying drawings, forming a part hereof.

This invention relates to focal-plane camera-shutters; and it consists of the novel construction, combination, and arrangement of parts hereinafter shown, described, and claimed.

The invention relates specifically to photographic shutters of the roller-blind type that work close in front of the sensitive plate or film and are well known as "focal-plane shutters."

The object of this invention is to provide a shutter for photographic cameras which may be used as an instantaneous shutter and which is also provided with a means whereby the duration of the exposure to the different parts of the photographic plate may be increased or decreased whenever desired by the operator.

It consists, essentially, of a spring-actuated blind of any opaque material operated by an endless flexible carrier, the movement of which can be controlled, thereby regulating the duration of the exposure to the different parts of the photographic plate, before which the said blind is drawn.

Another object is to provide an adjustable opaque curtain to operate around the sensitized plate which is carried by the frame.

Figure 1 is a side elevation of a camera in which my improved focal-plane shutter is used. Fig. 2 is a front side elevation of the box or frame carrying the shutter and the operating mechanism, portions of the frame being broken away to show better the arrangement of the different parts. Fig. 3 is a sectional view taken on the line $a\,a$ of Fig. 2 and looking in the direction indicated by the arrow. Fig. 4 is a sectional view taken approximately on the line $b\,b$ of Fig. 2 and looking in the direction indicated by the arrow. Figs. 5 and 6 are cross-sectional views taken on the lines $c\,c$ and $d\,d$ of Fig. 3, respectively, and looking in the direction indicated by the arrows on the said section-lines. Fig. 7 is a view showing a portion of a spring tension device made use of in carrying out my invention. Fig. 8 is a detail view showing the pawl and ratchet-wheel, the function of which is to hold the parts in proper adjustment after the winding-shaft has been operated. Fig. 9 shows an adjusting-frame which may be made use of in connection with my invention. Fig. 10 is a perspective view of a portion of a chain and curtain-carrying rod which constitute a part of my invention.

Referring to the drawings in detail, 1 indicates the box or frame which carries the shutter and the operating mechanism, and the front side of the said box is for the most part open, there being a portion 2 left at each end of the box projecting over a portion of the curtain for preventing the light from striking the sensitized plate, and a narrow portion 3 is left at each side of the front opening. On each end of the frame is an opening 4, and supported by the said frame at each end of the openings is a guide 5, within which the plate-holder is to be inserted when it is desired to use the device. Within each of the guides is a spring 6, the purpose of which is to hold the plate-holder in position when the device is in use.

Rotatably supported within the frame 1, near the front side thereof, is a pair of roller-shafts 7, the purpose of which is to coact with similar roller-shafts 8 9 in carrying the curtain. The roller-shaft 8 is supported similar to the shaft 7 and is located near the upper side of the frame, while the shaft 9 is arranged to operate within suitable slots 10, arranged diagonally near the lower corner of the box. The said shaft 9 is actuated outwardly by means of suitable springs 11, provided for that purpose; but, as is apparent, in case the curtain should be drawn too closely around the roller-shafts the said shaft 9 will be drawn inwardly, thereby holding the curtain at all times at exactly the proper tension.

I provide a shaft 12 within the frame 1, near the lower side thereof, keyed upon which is a pair of sprocket-wheels 13, one being located near each end of the frame 1. Near one end of the shaft 12 is keyed a sleeve 14, wound upon which is a cord $14^a$, the same passing outwardly through an aperture $14^b$ in the side of the frame, and rigid with the said sleeve is a ratchet-wheel 15, upon which operates a spring-actuated pawl 16. A pin 17, carried by the pawl 16, projects outwardly through a slot 18, thereby affording means for removing the said pawl from the ratchet-wheel whenever it is so desired. A shaft 19 in alinement with the shaft 12 is provided near the opposite side of the frame, one end of said shaft projecting through the side of the frame 1 and being provided with a crank 20, its purpose being to regulate the tension of the spring. Keyed upon the said shaft, near one side of the frame 1, is a disk 21, the same being provided on its outer surface with a plurality of notches within which a spring-pawl 22 engages, thereby holding the shaft in any position in which it is placed. Wound around the shaft 12 opposite from the cord 14ᵃ is a cord or other flexible connection 23, to which is connected a retractile coil-spring 24, the opposite end of said spring being connected to the shaft 19 by a similar connection 25. The shaft 19 is prevented from unwinding by the disk 21 and the spring-pawl 22, and the shaft 12 is held by the ratchet 15 and the pawl 16. When it is desired to increase the force or tension of the spring, all that is necessary is to wind the shaft 19 by means of the crank 20, thereby shortening the connection 25.

Mounted around the shafts 7 8 and over the sprocket-wheels 13 is a pair of chains 26 or other devices, the function of which is to operate the curtain or shutter. (See Fig. 5.) The camera shutter or curtain 27, as hereinbefore set forth, is carried around the roller-shafts 7 8 9. The ends of said shutter or curtain are retained in the proper position by suitable rods 28, the said rods being provided with hooks 29 on their ends, which hooks are adapted to engage with the links of the chains 26 or like devices. Thus the ends of the curtain or shutter may be drawn close together or held farther apart whenever desired for increasing or diminishing the exposure upon the plate, the shaft 9 permitting the adjustment to take place. The space between the ends of the shutter defines the exposed surface and, as above described, may be regulated at will.

When it is desired to use the device, the cord 14ᵃ is engaged and drawn outwardly, thereby rotating the shaft 12, winding the connection 23 around the same, thereby drawing out the spring 24. At the same time the chains 26 are operated, as is the curtain 27, and the ends of the curtain are drawn toward the upper or lower side of the focal plane, as the case may be. The pin 17 of the pawl 16 is then engaged, and the pawl is removed from the ratchet-wheel 15, allowing the shaft 12 to be rapidly rotated by the spring 24, thereby drawing the exposing-space rapidly before the focal plane upwardly or downwardly, as the case may be.

Parallel with the plane of the inner portion of the chains 26 in one side of the frame 1 is a slot 30, and operated in said slot is a friction-slide 31, the same carrying an inwardly-projecting pin 32. A similar pin 33, carried by the chain 26, contacts with the pin 32 in the backward movement of the chains, thereby lessening the rapidity of the movement with which the exposing-space is drawn before the focal plane and also increasing the duration of the exposure on certain parts of the sensitized plate for producing "high lights."

The device when used is inserted between the focusing-plate carrier and the body of the camera, as shown in Fig. 1, which insertion is made after the camera has been focused. The device is then ready for use, the operation of the different parts being above fully set forth. The device shown in Fig. 9 is a rectangular frame 34 of any preferred construction, which is to be inserted before the focusing-plate in order to adjust the same at the proper point. It may be removed after focusing or left in, as preferred.

I claim—

1. A photographic shutter, comprising a frame, roller-shafts mounted within said frame, a curtain mounted around said roller-shafts, there being an exposing-space between the ends of said curtains, means for enlarging or diminishing said exposing-space, means for moving said curtain, thereby making an exposure to different parts of the photographic plate at different times, and means for regulating the duration of the exposure to different parts of the photographic plate, substantially as specified.

2. A photographic shutter, comprising a frame, roller-shafts mounted within said frame, flexible endless carriers mounted around said roller-shafts, means for rotating one of said shafts in either direction, means for regulating the rapidity with which the said shaft will be rotated, means for operating said endless carriers when the said shaft is rotated, a curtain, means for holding said curtain at the proper tension, and means for moving said curtain when the said carriers are operated, substantially as specified.

3. A photographic shutter, comprising a frame, roller-shafts supported within said frame, endless flexible carriers mounted around said roller-shafts, springs for actuating certain of said shafts, means for regulating the tension of said springs, a curtain, means for retaining said curtain in the proper position, and means for operating said curtain, substantially as specified.

4. A photographic shutter, comprising a frame, a curtain, means for holding said curtain in the proper adjustment within said frame, flexible endless carriers, means for operating said endless carriers, means for graduating the movement of said endless carriers, and means for moving said curtain when endless carriers are operated, substantially as specified.

5. In a photographic shutter, a frame, a curtain supported within said frame, there being an exposing-space between the ends of said curtain, means for moving said curtain for making an exposure to different parts of the photographic plate, means for holding said curtain at the proper tension, and means for regulating the duration of the exposure to different parts of the photographic plate, substantially as specified.

6. A photographic shutter, comprising a frame, roller-shafts supported within said frame, means for actuating one of said shafts outwardly, endless flexible carriers mounted around certain of said roller-shafts, means for operating said carriers, and a curtain operated by said carriers, substantially as specified.

7. A photographic shutter, comprising a frame, roller-shafts supported within said frame, a spring for rotating one of said shafts, means for regulating the tension of said spring, means for preventing said shaft from rotating, means for releasing said shaft, flexible endless carriers mounted around said roller-shafts, means for operating said carriers when the spring-actuated shaft is rotated, a curtain, and means whereby said curtain is moved by the operation of the said carriers, substantially as specified.

In testimony whereof I affix my signature in presence of two witnesses.

GASSNER F. FRALEY.

Witnesses:
ALFRED A. EICKS,
JOHN D. RIPPEY.